May 29, 1962 J. J. HAGOPIAN 3,037,205

MAGNETIC RECORD DISC WITH GAS-SUPPORTED TRANSDUCER

Filed Oct. 9, 1956

JACOB J. HAGOPIAN
INVENTOR.

BY Paul Bliven

ATTORNEY 3,037,205
Patented May 29, 1962

3,037,205

MAGNETIC RECORD DISC WITH GAS-SUPPORTED TRANSDUCER

Jacob J. Hagopian, San Jose, Calif., assignor to International Business Machines Corporation, New York, N.Y., a corporation of New York Filed Oct. 9, 1956, Ser. No. 614,865
2 Claims. (Cl. 346—74)

The present invention relates to a magnetic disc, and the process of its construction and use. In particular, the present invention relates to those magnetic discs designed for use with magnetic transducer heads where such a head is spaced from a disc or spaced from and supported on a disc by a film of air. The construction of the head and the apparatus used for or the method of establishing such air film form no part of the present invention except as set forth herein.

During the transfer of data between disc and transducer the air film is only of the order of 0.001 inch. This means that the planarity of the disc surfaces must be maintained with small tolerances and that during the establishment of such air film, between disc and head, great care must be exercised or there will be damage of the disc and the data thereon by contact of the head with the magnetic coating of the disc. The smoother and more level the disc surface, the better will be the riding quality of an air-film lubricated magnetic head. The prior art relating to the establishment of an air film between disc and head is disclosed in application Serial No. 456,189, filed September 15, 1954, now abandoned, and the prior art concerning the process and article of magnetic discs is disclosed in Serial No. 518,353, filed June 27, 1955, now issued to applicant, Patent Number 2,914,-489, dated November 24, 1959, for Magnetic Coating Composition, in class 252–62.5.

The uniformity in thickness of a magnetic coating applied to a disc surface is very important for insuring constant signal output. Although spin coating of such discs has proven satisfactory, such a process is not well adapted to quantity production. Further, the prior art discs have not provided permanent reference marks thereon for use in indexing and timing of the discs.

It is an object of the present invention to construct a disc which will have portions thereof adapted to be contacted by a transducer head without damage to either head or disc, which portions may be contacted by the head during establishment of an air film support.

Another object of the invention is the construction of a magnetic disc having a form of screed which may be used for obtaining desired uniformity of thickness and planarity in applying magnetic coating to the disc.

A further object of the present invention is the construction of a magnetic disc with permanent index marks.

A still further object of the invention is that of achieving the previous objects by means of a single construction feature.

Other objects of the invention are the devising of and the use of a process for the manufacture of discs embodying the previous objects.

Still another object is that concerned with the method of using discs of the present invention whereby there is contact between disc and transducer head prior to and during establishment of an air support film therebetween.

The above mentioned defects of the prior art are remedied and these objects achieved by forming or placing on each of the recording faces of a disc base an annularly positioned land upon which a transducer head may rest or ride during the starting or ending of a data transfer operation, or during such times as there is not provided an air film between such head and disc for the spacing thereof and the support of the head on the disc. Such a land may, also, be called a screed as it may serve as a reference for striking off the surface of the magnetic material when such is applied to the disc. Also, in the sense that this land serves to protect the surface of the magnetic material from injury by the transducer head, it may be called a mask, or guard.

The construction and use of a record disc such as outlined above is hereinafter described in detail and shown in the accompanying drawings, in which.

Figures 1, 2:
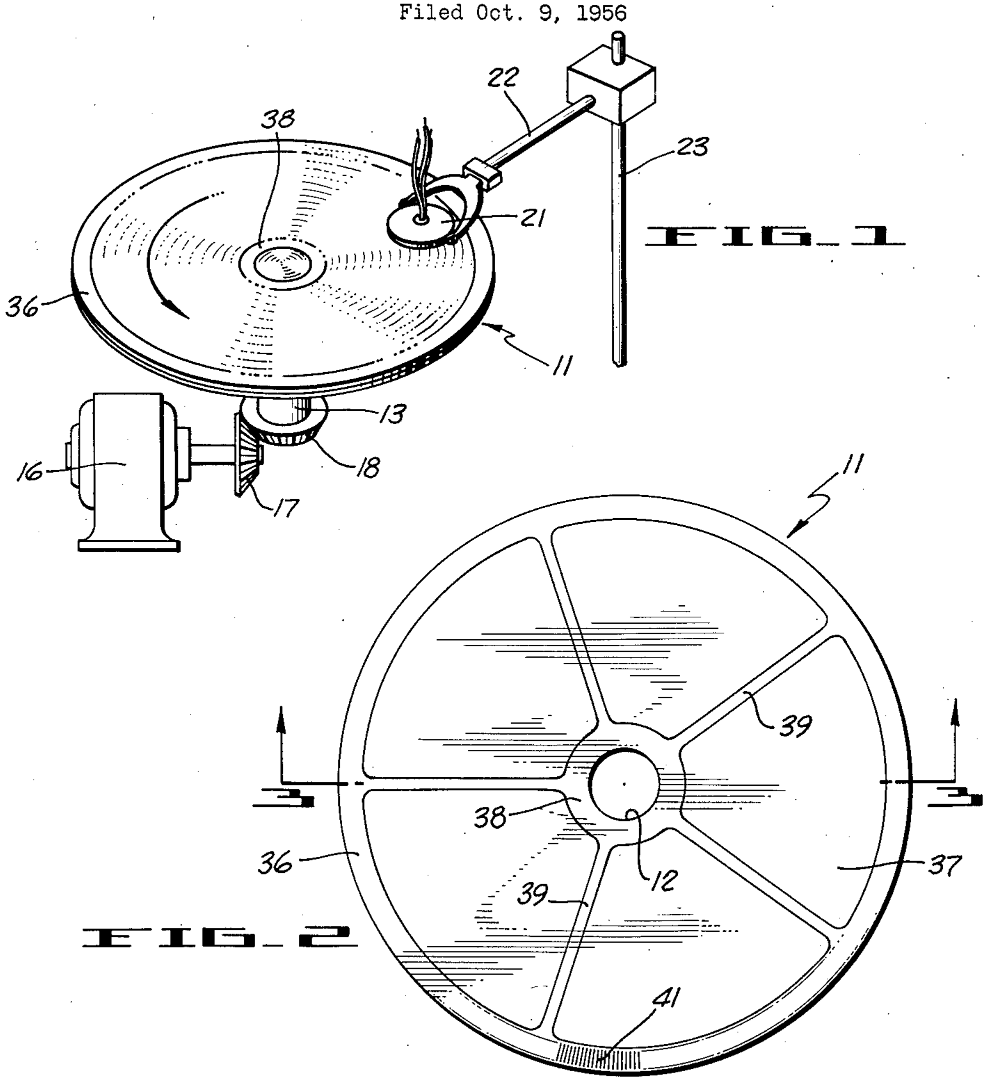
FIGURE 1 is a perspective view illustrative of the use of a magnetic record disc embodying the present subject matter.
FIGURE 2 is a plan view of a magnetic record disc embodying the present invention.
Figure 3:
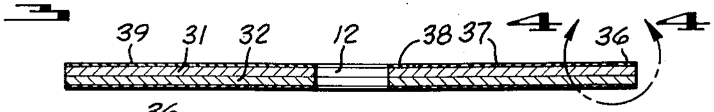
FIGURE 3 is a section on the line 3—3 of FIGURE 2.
Figure 4:
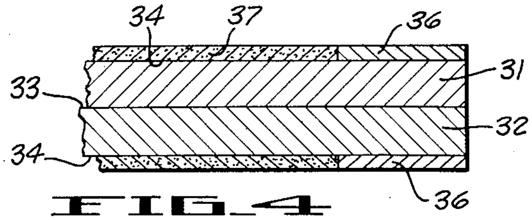
FIGURE 4 is a section on the line 4—4 of FIGURE 3.

The perspective view of FIGURE 1 illustrates one manner of using the magnetic record discs of the present invention. In this view, there is shown such a magnetic record disc 11 having an axial opening 12 formed therein. Through this opening extends a vertically disposed drive shaft 13 for the support and rotational drive of the disc. The shaft is rotationally driven by a motor 16 through a pair of miter gears 17, 18. A support for the motor and bearings for the vertical shaft are not shown.

A transducer is carried in a head 21 having universal support in and by an arm 22 to permit self-adjustment of the head relative to the surface of the disc 11. The position of the arm 22 is controlled by a staff 23 to which one end of the arm is secured. The construction of the head and its support are more fully disclosed in Serial No. 456,189, supra, as is also the establishment of an air film between disc and head. The head has a slight spring bias toward the disc.

The disc 11 has its main member, or base, formed of non-magnetic material such as aluminum. In the present showing this base is composed of two sheets of aluminum, an upper sheet 31 and a lower sheet 32. Each sheet is of the same size and shape, being a planar circle with a central opening 12. The sheets when assembled are in congruency, and are secured together at their inside faces 33 by any suitable means such as an adhesive. These discs are of a relatively large diameter, about two feet, with a central opening of about three inches. Each disc is about 18 gauge in thickness so that the two together are about one-tenth of an inch thick. For the present use, it is important that the sheet faces be nearly planar, that is, level, to reduce wobble when the disc is rotated. With a disc of such dimensions, a construction which will increase its rigidity is desirable.

The rigidity of the individual sheets, separately and when assembled, has been increased by securing adjacent the periphery and to the free face 34 of each sheet an annular, flat, non-magnetic outer ring 36. This ring has a radial width of about one inch and a thickness of approximately 0.001 inch, the thickness of the magnetic record coating 37 applied to each free face of the sheets, or disc. These peripheral rings add considerable rigidity to each disc.

These rings 36 find further use as screeds when the record coating is applied to a free face. The coating may be in the form of a magnetic pigment suspended in a resin binder and applied to the sheet surface by a silk screen process. After application of the coating, it is struck off by a straight edge or roller contacting the ring as a screed to gauge the thickness and to level the surface of the coating. This application of the coating may be done before two of the sheets have been secured together but after the ring has been fastened to the sheets, and with the inside face 33 of the sheet resting on a flat surface.

The shaft opening 12, on each side of the disc, may be surrounded by a flat inner ring 38 of a width and thickness the same as the peripheral ring 36. This inner ring 38 also is secured to its contiguous sheet, and serves as a screed. The outer and inner rings on a disc side may be joined together by a spoke or spokes 39. Such spokes serve as screeds and to further reinforce the disc against unevenness, bending, and wobble, and may also be used to divide a disc side into separate areas for the recording of separate forms or kinds of data. Such dividers 39 may be sensed by the transducer. In that these rings and spokes serve to guard the coating 37 from injury, they may be called masks or a mask. Brass and aluminum are suitable materials for the masks. These masks may be formed with, receive, or have applied thereto indicia which may be sensed by the transducer for disc-transducer orientation purposes. One form of indicia may be had by etching or cutting lines 41 in the mask, such as the radial lines shown in the outer ring 36, and by filling these lines with some of the coating material 37.

When discs of the present construction are used as indicated in FIGURE 1, the air film velocity with respect to the transducer head is engendered by rotation of the disc causing air to flow tangentially and radially thereof due to contact of the air therewith. Once this film velocity is established, the head may ride on the film without contacting the disc surface but will be closely spaced from the surface. When the air film is not present, the transducer head may ride on the outer ring 36 or mask. The head is so supported that there is a slight spring bias of the head to the disc surface. As the free faces of the mask and the coating are in the same plane, flush with each other, the head will not damage the coating when it rides on the mask. The surface of the mask may be plated with a polished friction reducing material such as chromium or rhodium or the mask itself may be formed of a non-magnetic material or compound having a low coefficient of friction. A lubricant may be applied to the mask. The use of these features will reduce friction between mask and head.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination a gas supported transducer having a riding surface; a magnetic recording element comprising a nonmagnetic disc-shaped base member having on one face thereof a concentric peripheral raised nonmagnetic rim of uniform height, said rim being at least as wide as the riding surface of said transducer; means connected to the center of said disc-shaped base for rotating said disc; a soft magnetic coating on said base formed substantially flush with and extending up to said rim; and transducer supporting means including means for producing a slight spring bias towards the disc, said supporting means being adapted to hold the transducer against the rim until the spring bias is overcome by establishment of an air film caused by rotation of said disc, said supporting means being further adapted to support said transducer for movement from a position over the rim to a position over the soft magnetic coating without disturbing the established air film.

2. Apparatus as claimed in claim 1 further characterized by the addition of nonmagnetic radially spaced spokes secured to said base member and having a height equal to said rim, said coating being formed substantially flush with and extending up to said spokes.

References Cited in the file of this patent

UNITED STATES PATENTS

| | | |
|---|---|---|
| 2,073,143 | Cunningham | Mar. 9, 1937 |
| 2,144,844 | Hickman | Jan. 24, 1939 |
| 2,299,738 | Collins | Oct. 27, 1942 |
| 2,493,745 | Blodgett et al. | Jan. 10, 1950 |
| 2,501,126 | Howell | Mar. 21, 1950 |
| 2,554,347 | Rouse | May 22, 1951 |
| 2,564,312 | Rossmann et al. | Aug. 14, 1951 |
| 2,594,893 | Fause | Apr. 29, 1952 |
| 2,628,881 | Adams | Feb. 17, 1953 |
| 2,631,919 | Dueringer | Mar. 17, 1953 |
| 2,702,760 | Barth | Feb. 22, 1955 |
| 2,758,905 | Curtis | Aug. 14, 1956 |
| 2,790,742 | Wharton | Apr. 30, 1957 |
| 2,950,353 | Fomenko | Aug. 23, 1960 |

FOREIGN PATENTS

| | | |
|---|---|---|
| 836,114 | Germany | Apr. 7, 1952 |